United States Patent [19]

Atkinson et al.

[11] Patent Number: 5,011,328
[45] Date of Patent: Apr. 30, 1991

[54] PERMEABLE BREAKWATER

[76] Inventors: Francis S. Atkinson, 6550 Orleans Ave., New Orleans, La. 70124; William G. McDougal, P.O. Box 1418, Philomath, Oreg. 97370

[21] Appl. No.: 299,493

[22] Filed: Jan. 23, 1989

[51] Int. Cl.⁵ .................................................. E02B 3/06
[52] U.S. Cl. ...................................... 405/30; 405/21; 405/32
[58] Field of Search ................ 405/30, 31, 32, 21, 405/29, 26, 15, 16, 34, 35, 33

[56] References Cited

U.S. PATENT DOCUMENTS

| 315,384 | 4/1885 | Boynton | 405/30 |
| 411,704 | 9/1889 | Wurts | 405/21 |
| 421,631 | 2/1890 | Sutherland | 405/30 |
| 2,055,150 | 9/1936 | Heskett | 405/32 |
| 3,415,061 | 12/1968 | Staempfli | 405/31 X |
| 4,129,006 | 12/1978 | Payne | 405/31 |

FOREIGN PATENT DOCUMENTS

168758  9/1921  United Kingdom .................. 405/32

Primary Examiner—Dennis L. Taylor
Attorney, Agent, or Firm—Donald J. Verplancken; David A. Rose; Ned L. Conley

[57] ABSTRACT

A permeable breakwater for submerged offshore or seawall retentive installation includes a base and permeable opposed sides terminating at an upwardly projecting permeable wave wall. The breakwater is located offshore to cause moderate to heavy waves to break further offshore thereby dissipating their energy before reaching the beach.

23 Claims, 10 Drawing Sheets

PERMEABLE BREAKWATER

BACKGROUND OF THE INVENTION

This invention pertains to the field of erosion prevention, and more particularly to offshore beach and shoreline erosion prevention devices.

Shorelines and beaches are subject to erosion from the action of waves impinging thereon. Wave action erodes beaches by several different mechanisms. Waves mobilize shoreline materials and then redistribute them, leading to erosion. Rising and falling water levels may erode beaches over a long period of time. Shoreline structures, including seawalls, pilings and levees, often increase beach erosion adjacent to those structures, by causing wave reflection, turbulence, eddies and currents. These currents mobilize the beach materials which may be transported along shore or offshore. Offshore currents, transversing the beach, can carry the beach materials many miles away until the current slows and the beach materials sink due to the influence of gravity. Further, heavy storms can impinge high waves on beaches and shorelines, imparting heavy forces which carry away the beach or crumble the shoreline leading to heavy erosion. Portions of Lake Michigan are particularly susceptible to shoreline erosion, and it is not uncommon for bluffs 20 to 40 feet high to erode 5 feet inland during the course of a year. The seawall area of Galveston, Tex. has for many years experienced severe beach erosion problems, where heavy seas carry the sand off the beach face and, because of ocean currents, deposit the sand some 5 to 10 miles away.

In a natural beach/water ecosystem, the shallow water extending up to the beach, and the beach face itself, act to dissipate the energy of the waves, thereby preventing erosion of the land area behind the beach. Typical water front profiles include a surf zone of relatively shallow water where the waves break into surf, a beach zone where a wave expends its last landward energy, and the land area behind the beach. The land areas typically include dunes, low barrier islands, alluvial fans and river deltas, or bluffs. During severe storm conditions when the waves are commonly two to three, and occasionally ten times their normal height, the typical beach response is the loss of material from the beach zone to an offshore sand bar. The sand bar then creates a shallow area offshore with a deeper trough between it and the beach face. The shallow area causes the waves to break on the sand bar, thereby initiating dissipation of wave energy further offshore and providing a wider surf zone. Both of these effects decrease beach erosion. It is not uncommon for a series of multiple sand bars to develop offshore. The sand bars tend to create a series of long ridges parallel to the beach, causing the waves to dissipate much of their energy offshore before they reach the beach. Over time, the beach-sand bar system stabilizes, and includes a relatively constant volume of sand. Heavy wave action tends to carry sand off the beach and deposit it on the sandbars. Long term low energy wave action moves the offshore sand bar back onto the beach face. This is known as the summer/winter beach profile response.

The establishment of an equilibrium between the beach face and the sand bars can take many years to develop, and minor changes in the shoreline, offshore water circulation patterns, and a myriad of other environmental factors can upset the environmental balance and thereby cause substantial beach or coastline erosion. Further, a particular ecosystem may be adverse to the continued existence of a substantial beach or a stationary coastline. The coastline of northern California is continuously eroding, and small beaches exist often only in sheltered coves or cuts in the bluffs which abut the sea. Further, unusual storms having wave heights experienced only every few decades will often severely depreciate the amount of beach material. Finally, municipalities and individuals, in a quest to increase the leisure value of shoreline, place sand on the shoreline to establish a beach. Such artificial beaches commonly wash away, because the shoreline, sea bed or lake bed structure is not compatible with the existence of a beach at the location of the artificial beach.

Many methods have been employed in an attempt to reduce shoreline erosion. These attempts have included both protruding and submerged breakwaters located offshore. The protruding breakwater reflects and/or dissipates the waves. A submerged breakwater also reflects and/or dissipates waves, or causes the wave to break further offshore. These breakwaters are typically constructed of concrete or stone, and are solid structures. Commonly, rubble or rocks are piled in a submerged line off the shoreline to form a breakwater.

Breakwaters have several deficiencies. Foremost, they are expensive to build and maintain. Rubble breakwaters erode by losing rock to the action of waves, and unstable subsoils commonly cause the rocks or concrete segments to sink into the sea or lake bed. The use of larger rocks to prevent wave displacement is expensive, because larger rocks cost more to quarry and transport.

Revetments and seawalls are also used to reduce shoreline erosion. However, these structures actually inhibit beach and sandbar growth. Therefore, although they may protect the shore behind the beach, they tend to erode the beach by requiring materials for offshore sandbar development to be provided by the adjacent unprotected beach and by creating intensified water currents which may permanently transport the beach materials out to sea.

On shore, devices other than revetments and seawalls are used to protect the beach. Beach grass may be planted to create a subsurface root structure which is more resistant to wave action than loose sand. However, this provides a low level of protection, and commonly requires constant nourishment and replanting.

A device known as a sand perch may also be used on the beach to prevent beach erosion. These devices are concrete structures having small channels, commonly less than four feet high, with a generally triangular cross section. Vertical or horizontal slots are found on their upward projecting triangular faces. The horizontal slots allow the seawater to pass through the channel, but the sand is trapped in the device thereby keeping the sand on the beach. Although this device reduces beach erosion, it is an unsightly addition to the beach.

SUMMARY OF THE INVENTION

The present invention is a relatively lightweight offshore wave damping and reflecting device for reducing the energy of waves reaching the beach or shoreline. The wave damping and reflecting device includes a series of support segments having a generally triangular cross section with a space therebetween. The triangular support segments are placed in series to form a breakwater structure. The support segments are installed on the sea floor off the beach such that one side of the triangle forms a base which lays on the sea floor and the longitudinal axis of the series of segments is substantially parallel to the expected wave motion. As a result, one upright side of the triangle will face landward, and the other side will face seaward.

A toe or anchor section projects downward from the segments to anchor the structure to the seabed. A wave wall projects upwardly from the apex of the triangular support segment to enhance the damping and reflecting of the waves by the breakwater structure. The series of triangular segments are attached side by side in series by passing a long stud through holes in the segments to form a breakwater section. A series of breakwater sections are then placed side by side to form a long permeable breakwater. It is contemplated that the breakwater will be placed a sufficient distance from shore so that the top of the wavewall will be 4 to 5 feet below the mean water level.

Many advantages are provided by the present invention. The permeable breakwater reduces wave energy before the wave reaches the shoreline, thereby reducing the extent of wave damage caused by high waves. The permeable breakwater is a relatively light weight, yet substantially a unitary device which will remain substantially intact despite repeated heavy wave energy absorption cycles. The permeable breakwater also lessens permanent beach sand loss during a typical summer/winter profile cycle. The permeable breakwater is relatively maintenance free and normally invisible thereby leaving an aesthetically pleasing appearance.

These, and other objects and advantages of the invention will be apparent from the following description when read with the accompanying drawings.

BRIEF DESCRIPTION OF THE DRAWINGS

For a detailed description of the invention, reference will now be made to the accompanying drawings, wherein.

BRIEF DESCRIPTION OF THE PREFERRED EMBODIMENT

Figure 1:
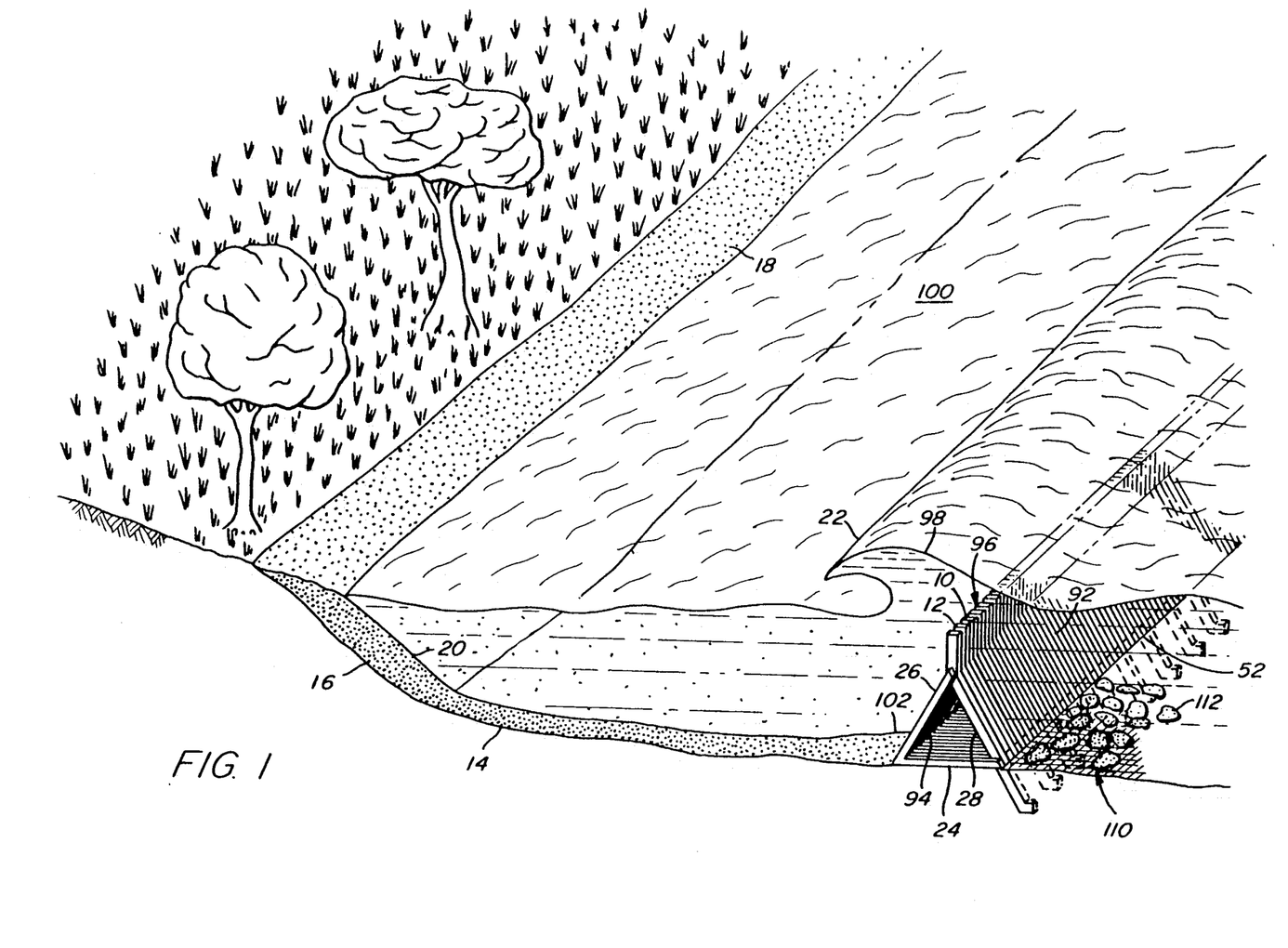
FIG. 1 is a perspective view of the permeable breakwater installed in an offshore application.

Referring initially to FIG. 1, the permeable breakwater 10 of the present invention includes a series of breakwater sections 12 submerged offshore and disposed on the sea or lake bed 14 at a distance from the shoreline 16. The shoreline 16 typically includes a beach 18, generally comprised of sand or other accumulants 20 which are naturally or artificially deposited on the beach 18. A plurality of breakwater sections 12 are laid in a row on the seabed 14 to form the permeable breakwater 10. Breakwater sections 12 are preferably constructed of cast concrete, although plastic pipe, cement filled plastic or metal pipe, cement filled extruded aluminum, steel or plastic channels, steel, wood, or other materials may be used. Breakwater sections 12 of cast concrete will typically weigh three tons per linear foot. To permit easy handling of the breakwater sections, twenty foot (sixty ton) sections are contemplated.

Permeable breakwater 10 operates to dissipate the energy of wave 22 before it reaches the shoreline 16 thereby reducing shoreline 16 and beach 18 erosion. Each breakwater section 12 includes a base section 24, a landward planar section 26 and seaward planar section 28 attached in triangular fashion to the opposed ends of base section 24. Base section 24 and seaward and landward planar sections 26, 28 form the perimeter of a triangle. However, other breakwater cross-sections, including polygons, arched shells, semi-circles or semi-ellipses may be employed without deviating from the scope of the invention.

Figure 2:
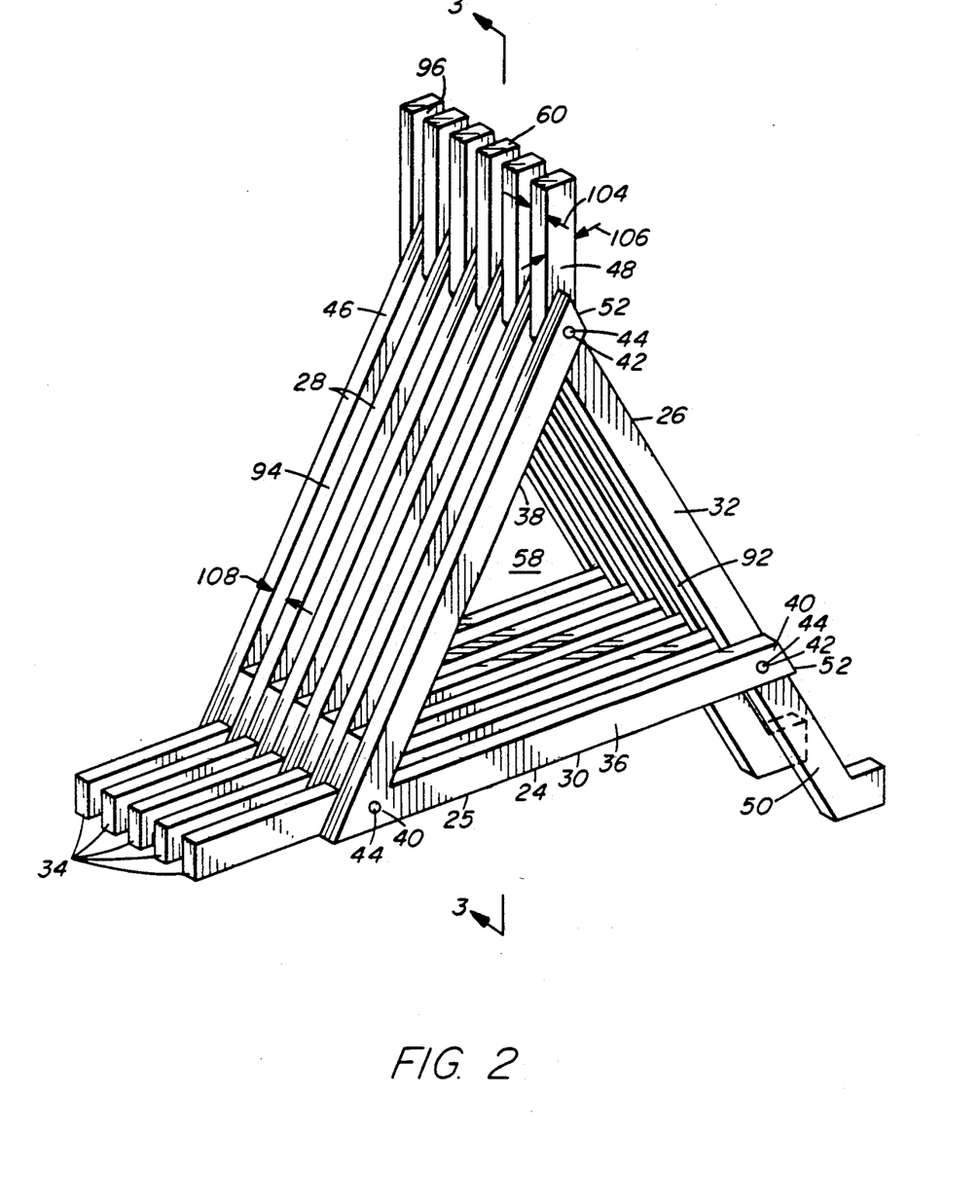
FIG. 2 is a perspective view of a series of segments forming a section of the permeable breakwater shown in FIG. 1.

Referring now to FIG. 2, breakwater section 12 includes a series of individual support segments 25 interconnected together to form section 12. Perch wall members 34 are spaced between adjacent support segments 25 to complete the construction of the breakwater section 12. Support segments 25 and perch wall members 34 are preferably cast from concrete. The casting of the concrete can be performed in a form at a location adjacent to the offshore installation of the permeable breakwater 10. However, the casting may be performed at an offsite plant or over the offshore installation site without deviating from the scope of the invention.

Figure 3:
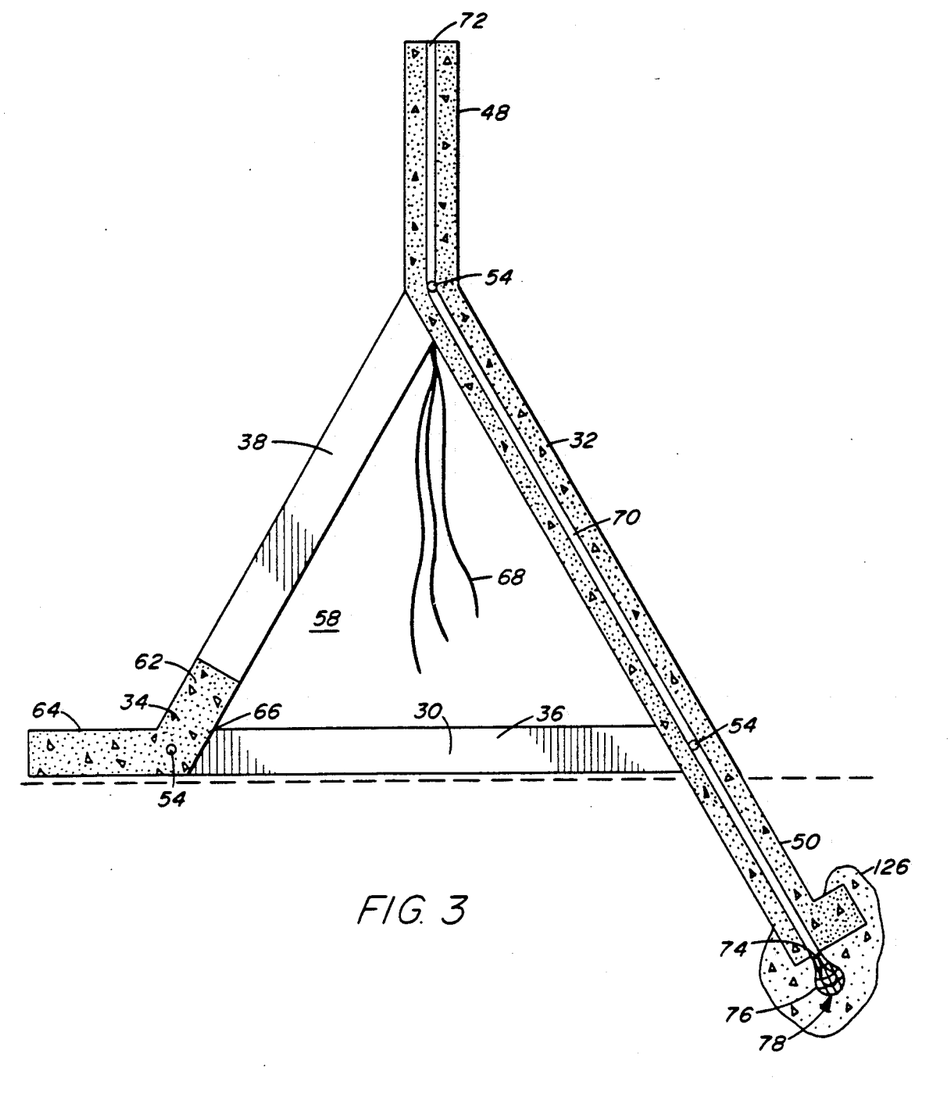
FIG. 3 is a cross-sectional view of the permeable breakwater at plane 3—3 of FIG. 2 installed in the water floor.

Referring to FIG. 3, perch wall members 34 include a generally upwardly projecting perch portion 62 and a generally horizontal perch base 64 integrally connected at 66. A hole 54 is located through perch wall members 34 at 66 for interconnection of perch wall members 34 with support segments 25. Upwardly projecting portion 62 can be prepared to varying lengths on site, thereby permitting the adjustment of the height of the perch wall members 34 to suit the needs of the particular site.

Referring to FIGS. 2 and 3, support segment 25 includes a base landward member 30 attached to a seaward member 32 to preferably form an equilateral triangle. Base landward support member 30 is angular and includes a bottom chord 36 and a landward chord 38 intersecting at juncture 40. Chord 38 extends upwardly and seawardly. Bottom chord 36 and landward chord 38 are preferably cast as a single continuous piece. The free chord ends 42 of bottom chord 36 and landward chord 38 are disposed opposite juncture 40. Mounting apertures 44 are disposed through chord ends 42 and at juncture 40, respectively, for the assembly of a plurality of support segments 25 and perch wall members 34 to form breakwater sections 12. Each mounting aperture 44 is a through hole, best shown in FIG. 4, passing through the width of base landward member 30. Upon assembly into a breakwater section 12, adjacent bottom chords 36 form base section 24. Likewise, adjacent landward chords 38 form landward planar section 26.

Seaward member 32 is a generally rectangular cross sectioned member having an upwardly extending leg 48 for reflecting waves and dissipating wave energy. In the preferred embodiment, every third seaward face member 32 in the breakwater section 12 includes a toe 50 on the end of seaward member 32 opposite leg 48. The toe 50 extends downwardly for insertion into seabed 14. Each seaward member 32 which does not include a toe 50 terminates at the interconnection 52 (best shown in FIG. 1) between bottom chord 36 and seaward member 32. Each seaward member 32 includes through holes 54, best shown in FIGS. 3 and 4, which align with mounting apertures 44 in chord ends 42 for the passage of a stud or bolt 56 therethrough to interconnect adjacent support segments 25 to form breakwater section 12. As best shown in FIGS. 1 and 2, base landward member 30 is mounted on one side of seaward support member 32 whereby upon assembly into breakwater section 12, member 30 acts as a spacer between adjacent seaward members 32 to form vertical slots 92 in seaward planar section 28 and vertical slots 94 in landward planar section 26. The spacing of legs 48 between the chord ends 42 of the landward chords 38 creates wall slots 96 therebetween. Adjacent staggered seaward members 32 form seaward planar section 28.

The size of base landward members 30, seaward members 32 and perch wall members 34 determines the size of each of slots 92, 94, and 96. As best shown in FIG. 2, where the width 104 of member 32 is eight inches and the depth of member 32 is twelve inches, the width 108 of slot 94 will be eight inches. In essence, the width of slot 94 will equal the width of member 32 and the width of slot 92 equals the width of landward chord 38. Variation of these widths will correspondingly vary the amount of slotted to non-slotted area, or permeability, of the permeable breakwater 10. Where the slot width 108 and member width 104 are equal, permeable breakwater 10 has fifty percent permeability. Under certain circumstances, it may be desirous to have greater or lesser permeability.

Referring now to FIG. 3, seaward members 32, which include toe 50, have a tubular channel 70 that is molded into seaward member 32 from the top of leg 48 and through toe 50 exiting at tubular exit 74 of the base of toe 50. Tubular channel 70 is preferably constructed in seaward member 32 by placing one or more sections of plastic tubing 72 into a mold and casting concrete around tubing 72 to form member 32. A screen 76 may be attached to toe 50 at tubular exit 74. Screen 76 is preferably a wire mesh basket which has a circular opening that is preferably cast into toe 50 around tubing 72 at exit 74 forming a basket 78 projecting therefrom for holding the cast concrete in engagement with toe 50. During installation, concrete is pumped down tubing 72 into basket 76.

Figure 4:
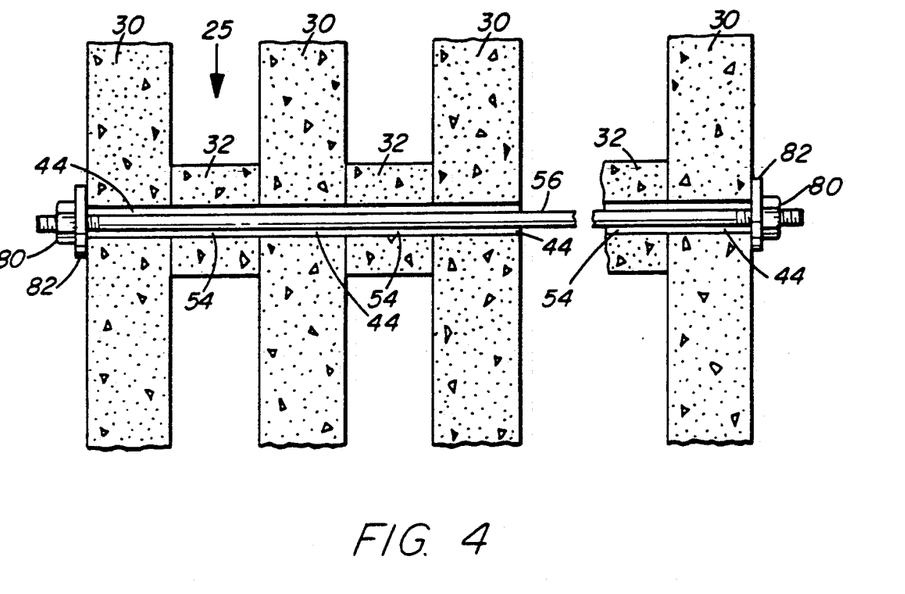
FIG. 4 is a partial cross sectional view of the connection of the segments at the apex of the breakwater shown in FIG. 1.

Referring now to FIG. 4, the alternating support segments 25 are interconnected by a stud 56 passing through mounting apertures 44 and holes 54. A nut 80 and washer 82 are threaded onto each end of stud 56. The washer 82 bears against segment 25 when stud 56 is tightened by nut 80. Stud 56 is preferably wrapped or coated with a rust resistant coating, including, for example, epoxy, vinyl, or other materials. After nut 80 is tightened onto stud 54, nut 80 and the end of stud 54 are coated with a rust resistant or inhibiting material. Each interface between hole 54 and mounting aperture 44 at each apex of the triangular section of breakwater section 12 is assembled using the connection means of stud 56 and nut 80 and washer 82.

Figure 5:
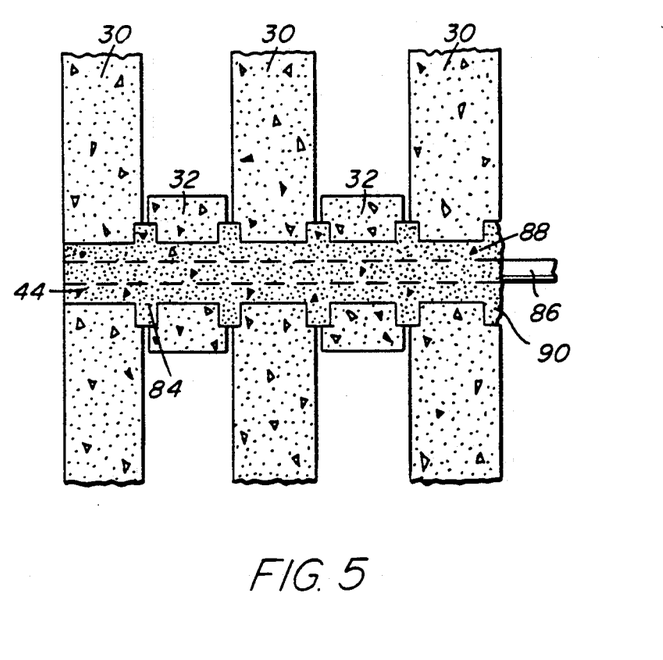
FIG. 5 is a partial cross sectional view of an alternative construction of the connection of the segments of the breakwater shown in FIG. 1.

Referring now to FIG. 5, an alternative assembly technique is shown. Each base landward member 30 and seaward member 32 includes a grouting recess 84 which is molded directly into the side of each base landward member 30 and seaward member 32 circumferentially about hole 54 and mounting aperture 44. A length of reinforcing bar 86 is passed through the series of aligned holes 54 and mounting apertures 44, and tensioned to force each base landward support member 30 into compressive contact with the adjacent seaward face member 32. Likewise, although not shown, the upwardly projecting portion 62 of each member 34 also includes recesses circumferentially located about the hole 54 therethrough, and reinforcing bar 86 is passed through the series of holes 54 and mounting apertures 44 of the adjacent perch members 34 and base landward members 30 and tightened to bring them into compressive contact. The reinforcing bar 86 is sized to create a concentric aperture 88 between the wall of holes 54 and mounting apertures 44 and reinforcing bar 86. A slurry of grout 90 is injected into concentric aperture 88. When grout 90 sets or hardens, the tension on reinforcing bar 86 is released, and the interaction of the grout and reinforcing bar maintains the breakwater section 12 as an assembly.

Referring again to FIGS. 2 and 3, upon the assembly of support segments 25 and perch wall members 34 into the breakwater section 12, a longitudinal hollow triangular cross-section or dissipation and settlement cavity 58 is formed extending the length of section 12 and normal to the direction of the wave 22. Adjacent legs 48 form an upward projecting permeable wave wall 60 at the juncture of seaward member 32 and landward chord 38. Upon assembly into breakwater section 12, perch section 62 is parallely disposed with, and between, adjacent landward chords 38 forming a continuous non-permeable wall along the lower section of landward planar section 26.

Dissipation and settlement cavity 58 acts as a low velocity water cavity wherein sand and other water suspended accumulants may settle out of suspension. Dissipation and settlement cavity 58 may include fronds 68 or other dissipation devices such as screens or slotted grates which act to further reduce the energy of water travelling through the vertical slots 92, 94 of breakwater section 12 and thereby reduce the water velocity and increase the wave energy dissipation of the permeable breakwater 12. Fronds 68 are preferably strips of plastic suspended at one end at the intersection of seaward member 32 and landward chord 38. As water passes through breakwater section 12 and dissipation and settlement cavity 58, it impinges upon and looses energy due to fronds 68.

Referring now to FIG. 1, the impact of the water from wave 22 on seaward planar section 28 creates a secondary undertow which tends to scour the seabed 14 adjacent the base of seaward planar section 28. Further, the pressure of the water impinging on the permeable breakwater 10, and the turbulence caused thereby, may tend to destabilize the seabed below the breakwater sections 12 when they are first installed. To address this problem, a filter fabric 110 is placed on the seabed 14 under each breakwater section 12 and extending seaward therefrom. Rip rap 112, or other heavy scour resistant materials are placed on the filter fabric 110 extending seaward from breakwater sections 12 to help prevent scouring. Without the filter fabric 110 and rip rap 112, the seabed 14 could destabilize, causing the breakwater section 12 to sink into the seabed 14 or be washed away.

Figure 6:
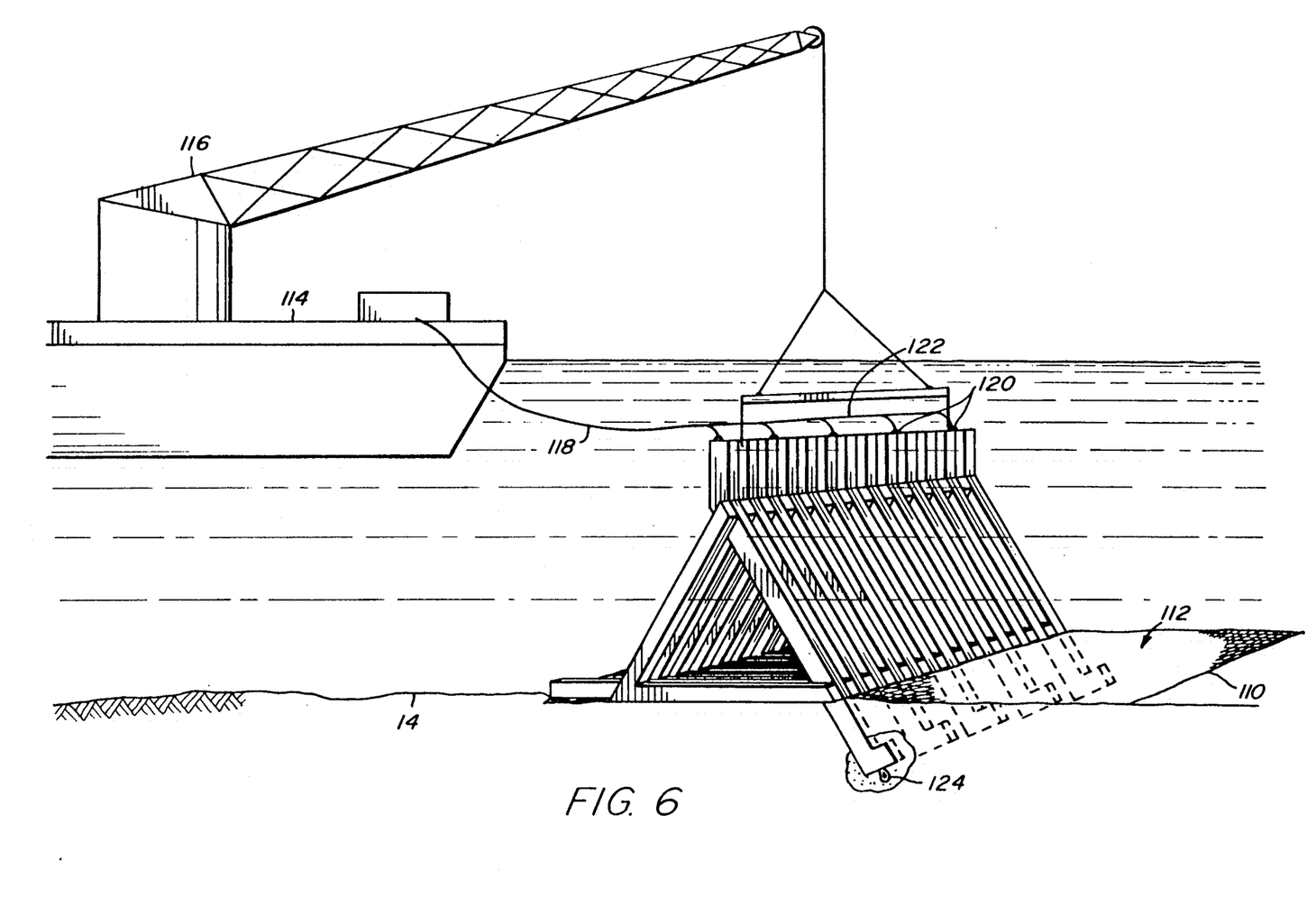
FIG. 6 is a diagrammatical view, partially in perspective, of the installation system employed to install the breakwater sections of FIG. 2.

Referring now to FIGS. 3 and 6, the installation of the permeable breakwater 10 on the seabed preferably includes the use of a ship or barge 114, having a crane 116 and a hydraulic system for lifting and placing breakwater sections 12 into place on the seabed 14.

To assemble the permeable breakwater 10, breakwater sections 12 are assembled onshore and placed onto a barge 114 for transport to the installation site. Prior to installation of each breakwater section 12, the toes 50 are passed through filter fabric 110 and the filter fabric 110 is brought up against base section 24 and attached thereto with metal ties, twine, or other temporary attachment means. A portion of filter fabric 110 extends outward from the seaward side of breakwater section 12. The breakwater section 12, or several sections 12, are placed on a barge 114, and transported out above the ultimate installation site. The filter fabric 110 may be alternatively installed to the breakwater segments 12 on the barge 114, or placed on the seabed 14 and the breakwater sections 12 then placed thereon. Barge 114 includes a crane 1!6 for lifting and positioning the breakwater sections into position for installation, and a hydraulic system for pumping water or concrete into the tubular channels in the breakwater section 12 during installation thereof. The hydraulic system includes a multiport hose 118 which is releasably connected to tubular channels 70 at their interface with the ends of legs 48. One portion 120 of hose 118 is attached to each channel 70 of the particular breakwater section 12 being installed. The hose portions 120 intersect at a hose junction 122, which permits the water or concrete passing through hose 118 to split into the hose portions 120 for injection into tubular channels 70.

After hose portions 120 are attached to tubular channels 70, crane 116 lifts the breakwater section 12 out of barge 114, and lowers it adjacent the seabed 14 below. The filter fabric 110 is preferably attached to the breakwater segment 12 prior to this point. Once the breakwater section 12 is properly positioned, with toe section 50 resting just off seabed 14, water is injected under pressure through hose 118 into tubular channels 70 and out through tubular exits 74 Where it forms water jets 124. The action of the water jets 124 begins fluidizing the surface of seabed 14 allowing toes 50 to begin sinking into seabed 14. As the breakwater section 12 sinks into the seabed, the water jets 124 continue fluidizing the seabed 14 allowing toes 50 to begin lowering into seabed 14. As the breakwater section 12 sinks into the seabed, the water jets !24 continue to fluidize the adjacent seabed, forming a mud slurry. Once the breakwater section 12 settles over filter fabric 110 onto seabed 14, continued water jet action maintains the seabed 14 adjacent tubular exit 74 in a mud slurry. At this point, a water settable cement slurry is injected down hose 118 through tubular channels 70 out tubular exit 74 and into the mud slurry in seabed 14. Sufficient cement is injected to form a cement ball 126 about toe 50. As cement ball 126 hardens, it remains attached to toe section 50 by hardening around basket 78. At this point hose 118 is released, and crane 114 releases breakwater segment 12 which is now attached to the seabed 14. Further breakwater segments 12 are likewise installed to form permeable breakwater 10. After the breakwater sections 12 are installed, rip rap 112 is laid over the filter fabric 11?, disposed seaward of the breakwater sections 12 to prevent erosion.

Referring again to FIGS. 1 through 3, the operation of the permeable breakwater 10 is shown. The series of vertical seaward permeable slots 92 and the series of landward permeable slots 94 permit the passage of water through permeable breakwater 10. The landward permeable slots 94 are limited by the intrusion of perch members 34 between adjacent landward chords 38, and are therefore slightly smaller in area than seaward permeable slots 92. Further, the spacing of the seaward members 32 creates wall slots 96 between adjacent legs 48.

As waves 22 approach and pass over permeable breakwater 10, wave energy is dissipated and reflected by the seaward planar section 28 of permeable breakwater 10 and dissipated and reflected due to the passage of water through the permeable slots 92, 94, and 96 thereof.

As best shown in FIG. 1, wave 22 breaks over permeable breakwater 10, forming a breaking wave crest 98. The breaking action is caused by the sudden apparent reduction in water depth caused by the protrusion of the permeable breakwater 10 off of the seabed 14. Wave 22, prior to breaking, has a wave height measured from the trough to crest of the wave. Because a wave will typically break when the mean depth, i.e., the depth of the water if no waves were present, is approximately one hundred and twenty five percent of the wave height, the addition of permeable breakwater 10 offshore creates a reduced depth condition much further from the shoreline 16 than would occur under natural conditions without the installation of breakwater 10. For example, where seabed 14 has a gradient of about 2/10, i.e., two foot of depth increase per ten feet of distance from shoreline 16, a ten-foot wave would naturally break approximately sixty feet from shore where the mean water depth is twelve feet. However, assuming permeable breakwater ten is fifteen feet high, the breakwater 10 may be placed 100 feet offshore and cause a wave to break thereover dissipating the wave energy in the expanded area between the permeable breakwater 10 and shoreline 16, or surf zone 100. Under natural conditions, in the above example, the surf zone 100 is sixty feet. However, using the permeable breakwater, the surf zone 100 is expanded to one hundred feet. As a result, destructive wave energy is dissipated in the one hundred foot surf zone 100, and only a small portion of wave energy reaches the shoreline 16 thereby reducing beach 18 and shoreline 16 erosion.

In most inland, i.e., fresh water, bay or estuary areas, ten-foot waves are rare, and are normally caused only by severe storms. Likewise, on most ocean coasts, ten-foot waves reaching protected shoreline 16 are the exception rather than the rule. Thus, where smaller waves, for example less than one-foot waves, are encountered, the permeable breakwater 10 will not affect the wave breaking location. It should be appreciated that different permeable breakwater heights will be employed depending on site conditions. Factors including the normal yearly wave cycle, the need for deepwater navigation, the type of beach to be protected, and the beach 18 and seabed 14 profile, all influence the selection of the size and location of the permeable breakwater—10. For example, where the seabed gradient is slight, the permeable breakwater 10 may be placed much further from shoreline 16. Where the gradient is steep, the permeable breakwater 10 will be placed closer to shore. Alternatively, the permeable breakwater 10 may be shorter and placed closer to shore, or taller and placed further from shore.

In addition to initiating wave energy dissipation further offshore, the extension of the surf zone 100 caused by the installation of the permeable breakwater 10, reduces the velocity of the wave 22 over the enlarged surf zone 100 which allows for greater settlement of particulates out of the water in the surf zone 100. Therefore, sand 20 suspended in the water in the surf zone 100 will settle out faster in the modified wave conditions than would occur under natural conditions.

Wave energy is also dissipated within permeable breakwater 10. As wave 22 approaches permeable breakwater 10, water is forced against seaward planar section 28, and a portion of the water passes through seaward permeable slots 92 and enters dissipation and settlement cavity 58 where it impinges upon fronds 68 or other dissipation devices and the perimeter of settlement cavity 58. The action of fronds 68 and settlement cavity 58 reduces the water velocity which encourages the settlement of sand 20 and other suspended particulates within settlement cavity 58.

As each wave passes over permeable breakwater 10 and propagates onto beach 1B or shoreline 16, the water returns off of the beach and creates an undertow, or a seaward underwater current. If this current has sufficient velocity and turbulence, the current scours the seabed 14 and picks up sand 20 and other seabed 14 materials and carries them out to sea causing permanent sand loss to the beach 18. Permeable breakwater 10 alleviates this problem by blocking the free seaward travel of the undertow at perch wall members 34. As the undertow impinges upon perch wall members 34, the undertow velocity decreases and sand 20 and other particulates settle out of suspension forming a sand perch 102 at the base of landward planar section 26 extending into settlement cavity 58. The undertow current travels through landward permeable slots 94 to further deposit sand within settlement cavity 58.

Permeable breakwater 10 also reduces erosion of beach 18 and shoreline 16 by reflecting wave energy off of seaward planar section 28 and permeable wave wall 60 back out to sea. During low wave conditions, the reflective action of permeable breakwater 10 is minimal, because little if any wave energy will reach the seaward planar sections 28 or permeable wavewall sections 60 of the permeable breakwater 20. For example, where the top of permeable wave wall 60 is five feet below the mean water line, one to two foot waves with short wave periods will cause little change in the water velocity adjacent permeable wave walls 60 and seaward planar sections 28. As the wave height and period increase, the waves first begin reflecting off of permeable wave wall 60. Then as the wave conditions further increase, the effect of seaward planar section 28 comes into play. The reflecting action of permeable breakwater 10 reaches its peak when severe weather or other geological, atmospheric or environmental factors cause high waves.

FIGS. 7-11 illustrate alternative configurations for support segment 25 whereby the cross-section of breakwater section 12 is modified.

Figure 7:
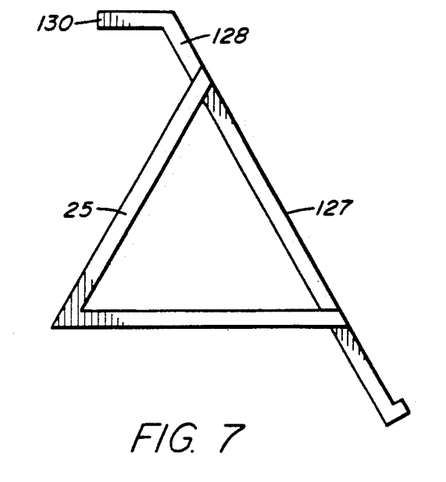
FIG. 7 is a side view of an alternative construction of the breakwater shown in FIG. 1.

Referring now to FIG. 7, an alternative embodiment of the support segment 25 includes a seaward member 127 having a landward projecting leg 128 which is a colinear extension of seaward member 127 as distinguished from the leg 48 of the preferred embodiment which extended vertically upward. Each landward projecting leg 128 further includes a foil member 130 which projects substantially horizontally landward from the end of each landward projecting leg 128. The adjacent foils 130 on adjacent landward projecting legs 128 form a water foil (not shown). The action of waves 22 over water foil creates a downward force to help retain breakwater section 12 in place.

Figure 8:
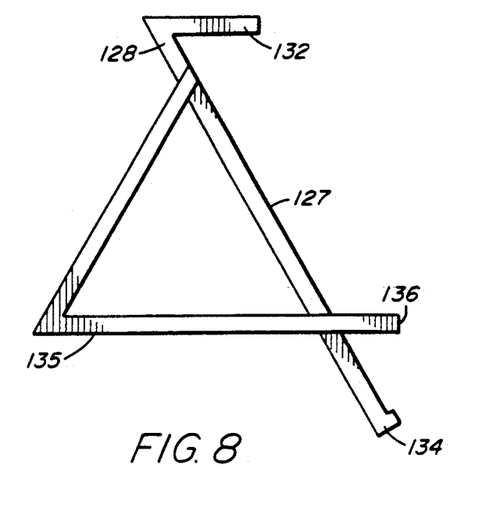
FIG. 8 is a side view of another alternative construction of the breakwater shown in FIG. 1.

FIG. 8 shows a further embodiment of the permeable breakwater 10 shown in FIG. 7, wherein a foil 132 projects seaward from landward projecting leg 128. Further, right angle toe 134 projects normally from seaward member 127 and bottom chord 135 extends outward past seaward member 127 forming bottom chord extension 136 which supplies greater bearing area on base section 24 to help prevent the breakwater section 12 from sinking into an unstable sea bed 14 or from tipping over under high wave 22 conditions. Right angle toe 134 increases the anchoring effect of the toe as compared with the horizontal toe 50 of the preferred embodiment.

Figure 9:
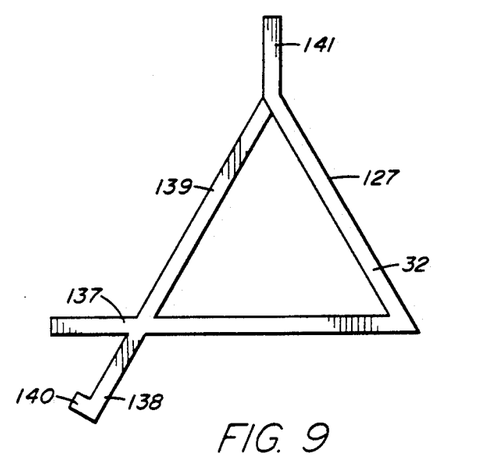
FIG. 9 is a side view of another alternative construction of the breakwater shown in FIG. 1.

Referring now to FIG. 9, a further embodiment of the permeable breakwater 10 is disclosed wherein the toe of member 127 is eliminated and a perch heel 138 is added to an extension of landward chord 139 to help anchor the breakwater section 12. Perch heel 138 is a continuation of landward chord 139 projecting below seabed 14 and includes a heel anchor 140 projecting normally and upward from perch heel 138. In this embodiment, a channel is provided in landward chord 139 for water and concrete injection to help insert and anchor breakwater section 12 in seabed 14. Bottom chord extension 137 increases the area of base section 24 thereby helping to prevent sinking of the breakwater section 12 into seabed 14 or tilting under heavy wave 22 conditions. In this embodiment the leg 141 is made an extension of chord 139 rather than seaward member 127.

Figure 10:
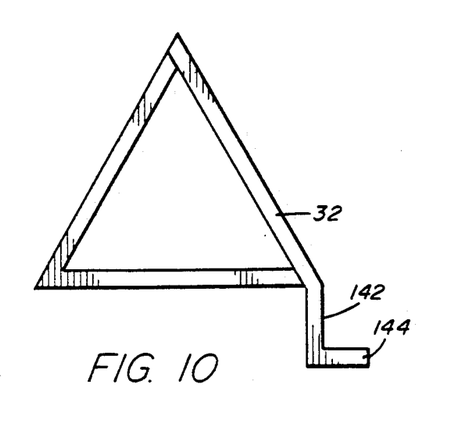
FIG. 10 is a side view of another alternative construction of the breakwater shown in FIG. 1.

Referring now to FIG. 10, an alternative embodiment of the permeable breakwater 10 is shown wherein the legs are eliminated and the toe is modified to include an anchor section 142 projecting perpendicularly into seabed 14 and horizontal toe 144 projecting seaward from the end of anchor section 142.

Figure 11:
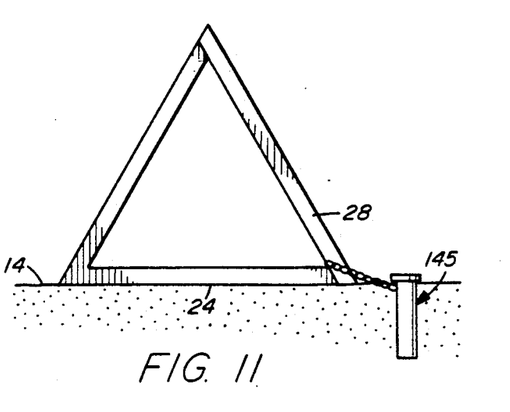
FIG. 11 is a side view of another alternative construction of the breakwater shown in FIG. 1.

FIG. 11 shows a further alternative embodiment of the invention, wherein the toe and heal sections are eliminated and the base 24 of seaward planar section 28 is attached to a plurality of pilings 145 driven into the seabed. The method of attaching the section to pilings 145 may include chains, wire rope or any other form of permanent anchoring.

Although various permeable breakwater features have been described, many of the features may be combined to form still further combinations. Further, features such as toe 50, permeable wave wall 60 and perch wall members 34 may be eliminated entirely, leaving a simple triangular structure. Likewise, perch heel 138 may be combined with toe 50, and have the same perpendicular structure as anchor section 142 and horizontal toe 144.

Figure 12:
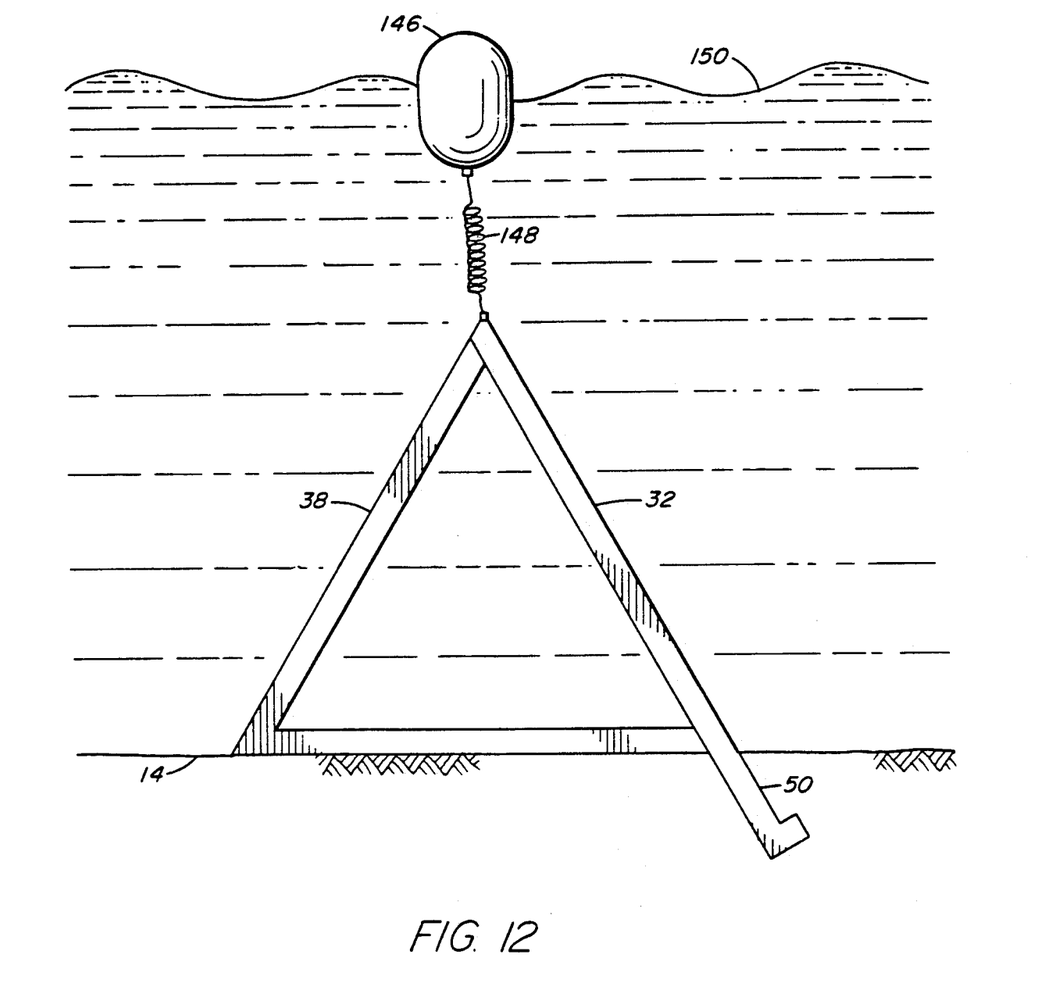
FIG. 12 is a side view of another alternative construction of the breakwater shown in FIG. 1.

FIG. 12 shows another embodiment of the invention, wherein the legs 50 of the preferred embodiment are replaced with a series of floats 146 attached to the intersection of landward chord 38 and seaward member 32 by a chain 148 or other attachment means including cable, rope, permeable and impermeable members. These members permit float 146 to partially project above waterline 150. Float 146 is preferably constructed of solid polyurethane foam, although hollow floats, lengths of wood, or other floating materials may be employed without deviating from the scope of the invention. A series of floats 146 act to reflect a portion of the energy of waves 22 as they pass permeable breakwater 10. Further, float 146 serves as a navigation aid to warn ships, bathers and pleasure boaters of the permeable breakwater 10.

FIGS. 13 through 19 illustrate the use of the breakwater sections 12 for land reclamation projects. Permeable breakwater 10 is modified to form permeable reclamation wall 151 which is formed by linking a series of reclamation wall section 156 end to end to obtain a wall of the desired length. Permeable reclamation wall 151 is placed on sea or lake bed 14, and dredging spoil is pumped into the reclamation area 154 between shoreline 16 and permeable reclamation wall 151. The water is allowed to drain out, leaving silt 152 behind. Repeated pumping and draining builds up the silt deposit 152 between the shoreline 16 and permeable reclamation wall 151.

Figure 13:
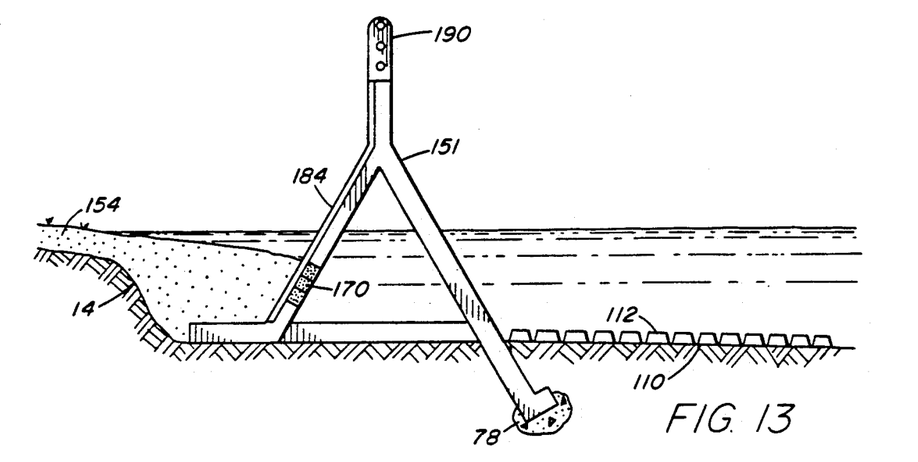
FIG. 13 is a side view of the breakwater of FIG. 1 modified for use as a reclamation wall.
Figure 16:
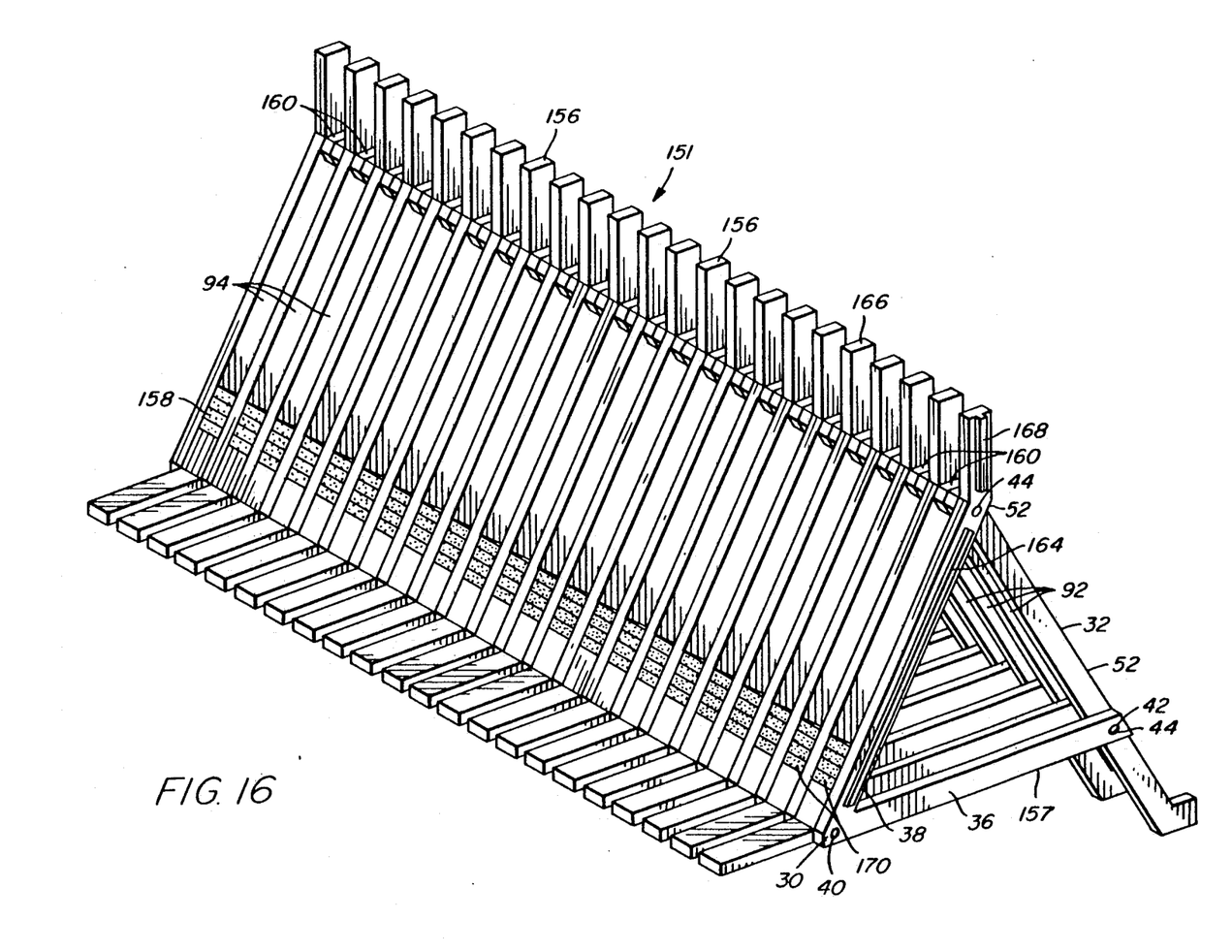
FIG. 16 is a perspective view of the reclamation wall of FIG. 13.

Referring now to FIGS. 13 and 16, each reclamation wall section 156 is formed by connecting a series of wall segments 157 together. Wall segments 157 are essentially identical to support members 25 but modified for use in a reclamation structure. Landward chord 38 of wall segment 157 is modified to include a pair of opposed longitudinal lower rail members 164 extending into each landward vertical slot 94. Further, chord end 42 of landward chord 38 is modified to include a reclamation leg 166 projecting upward therefrom. Reclamation leg 166 replaces leg 48 on seaward member 32. Each reclamation leg 166 includes a pair of longitudinal rail members 168 disposed thereon and extending into the gap therebetween.

Perch wall members 34 are disposed between adjacent landward members 30, and connected thereto with a stud 56 or other interconnection means. The upper face of perch wall member 34 is substantially flat and forms a support face 158. Perch wall members 34 are wider than base landward members 30 and seaward members 32. Thus when adjacent wall segments 157 are interconnected to form a reclamation wall section 156, a filler block 160 is located between chord end 42 of landward chord and the upper terminus of seaward member 32 to make up the difference in size.

Figures 17, 19:
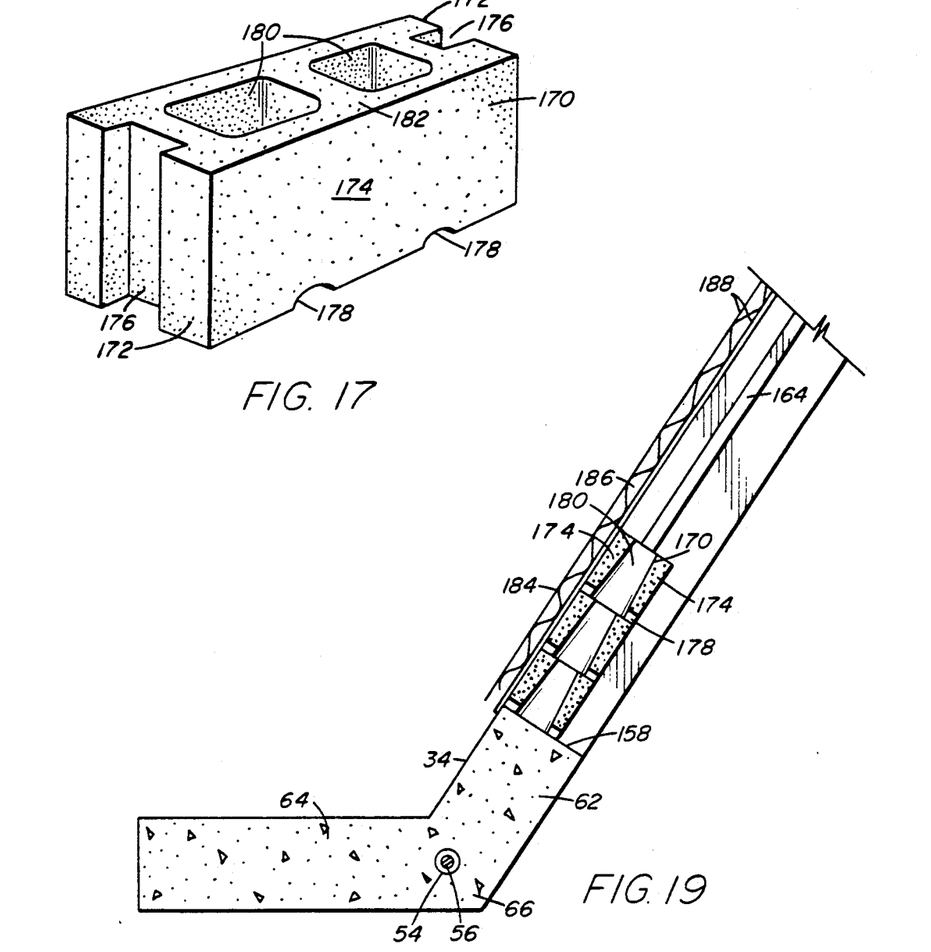
FIG. 17 is a perspective view of the filter block used in the reclamation wall of FIG. 13.
FIG. 19 is a partial cross sectional view of the heal and perch section of the reclamation wall of FIG. 13.
Figure 18:
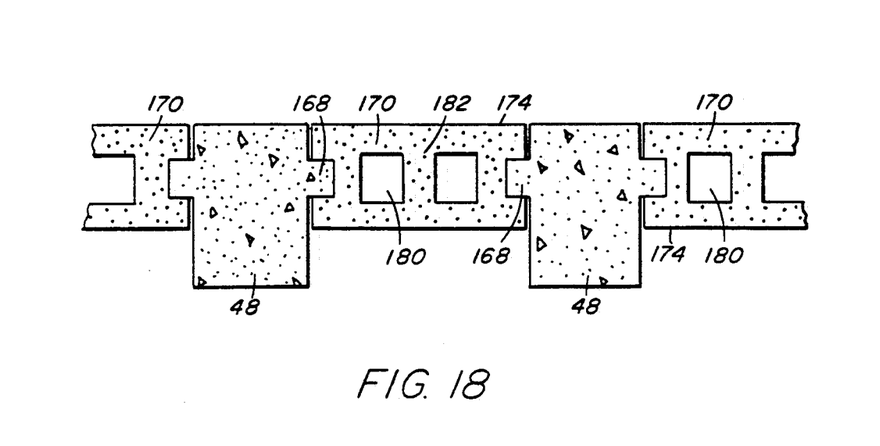
FIG. 18 is a partial cross sectional view of the reclamation wall of FIG. 13.

Referring now to FIGS. 16, 18 and 19, each landward chord 38 includes a lower rail member 164 projecting outward from each side thereof which extends substantially the entire length of chord 38. Lower rail members 164 are substantially rectangular projections integrally molded into the sides of each landward chord 38, and extend thereon from the end of perch portion 62, adjacent support face 158, to just below chord end 42. Likewise, an upper rail member 168 is disposed on each side of each reclamation leg 166 and extends from the upward terminus of each reclamation leg 166 to just above chord end 42. A series of filter blocks 170 are aligned on opposed lower rail members 164 and upper rail members 168 to create a permeable wall for selected drainage of water therethrough. Lower rail members 164 terminate a sufficient distance from chord end 42 of landward chord 38 to permit filter blocks 170 to be placed on the end of the rails 164 without interference from interconnection end 52 of seaward members 32.

Referring now to FIGS. 17, 18 and 19, filter blocks 170 have a generally rectangular shape, and include notched ends 172 and longitudinal sides 174. Notched sides 172 include cutouts 176 disposed thereon which are sized to slidingly receive lower and upper rail members 164, 168. Longitudinal sides 174 include a series of drainage passages 178, preferably two, therethrough. Drainage passages 178 are preferably semicircular holes disposed through filter block 170 at the base of sides 174.

Filter blocks 170 further include central passages 180, preferably two, located therethrough between and substantially parallel to cutouts 176. Passages 180 are generally rectangular and have tapered sides, such that the rectangular cross section of the passages 180 is greater near the bottom than the top of filter block 170. Central passages 180 from a web 182. Each drainage passage 178 preferably communicates with a single drainage passage, creating a pathway for water drainage into one longitudinal side 174, through central passage 180 and out the opposite longitudinal side 174.

Figure 14:
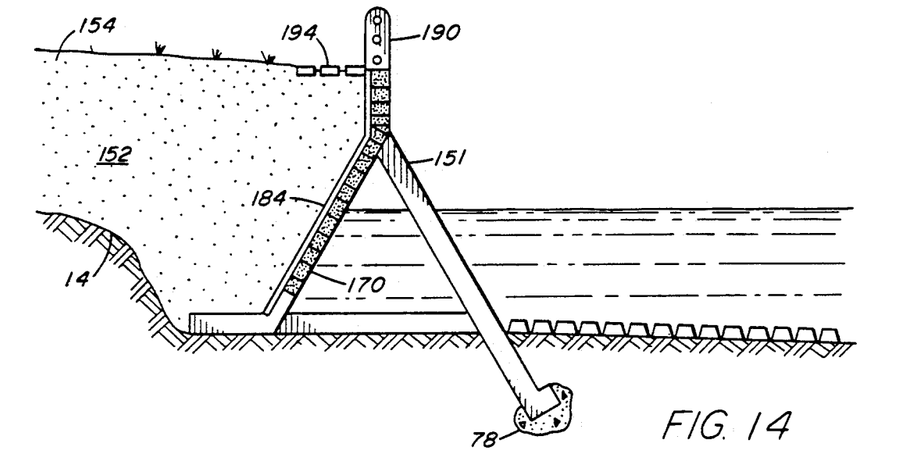
FIG. 14 is a side view of an alternative embodiment of the reclamation wall of FIG. 13.

Referring now to FIGS. 14 and 19, a filter pad 184 is disposed against the landward side of adjacent perch members 34 and landward chords 38, extending up to the chord ends 42 of landward chords 38. Filter pad 184 has a central corrugated core sheet 186 with filter sheets 188 disposed in sheet form on either side of corrugated core sheet 186. Filter pad 184 may be laid on the outer surface of adjacent perch members 34 and landward chords 30 in sections.

To protect the public against the danger of falling over the end of the permeable reclamation wall 151 when the reclamation area 154 is fully reclaimed, reclamation legs 166 may include upwardly projecting fence posts 190 for attaching a fence thereto. Each reclamation leg 166 need not include a fence post 190. For instance, fence posts might be present on every fourth or fifth reclamation leg 166 as needed. Fence posts 190 may be integrally molded of concrete when reclamation leg 166 is constructed.

Referring now to FIGS. 13 through 16, permeable reclamation wall 151 is located at the intended interface between the lake or sea and the edge of the reclaimed area 154. Reclamation wall segments are 156 sunk to rest on filter fabric 110 which is located on the seabed 14, and toe sections 50 are sunk into seabed 14 and anchored therein by a concrete ball 126. Rip-rap 112, or a rip rap trench, is disposed over filter fabric 110 to maintain each reclamation wall segment 156 in place. At this point, spoilage containing silt, soil, sand or other seabed material is pumped into reclamation area 154. Over time, the water drains off leaving silt 152 behind. After numerous dredging cycles, the level of silt 152 will rise to the level of support face 158. Before the silt 152 reaches the level of support face 158, a filter pad 184 is located against the landward chords 38 and perch portions 62. The silt 152 will maintain filter pad 184 in contact with reclamation wall segment 156. At this point, a filter block 170 is slipped over the upper end of each pair of lower rail members 164 and lowered until it bears upon support face 158 with drainage passages 180 abutting support face 158. A filter block 170 is placed in each landward slot 94 behind filter pad 184. At this point, more dredging is performed, and the reclamation area 154 is filled with the dredge spoil and allowed to settle. The reclamation area 154 is repeatedly filled with spoil until the level of silt 152 in the reclamation area 154 reaches the top of the filter block 170. At this point, another row of filter blocks 170 are added, and the dredging process is repeated until the level of silt 152 reaches the last filter block which will stack on rails members 164 between landward chords 38. The last filter block 170 will typically locate on lower rail members 164 such that only a portion of cutouts 176 are engaged thereon.

Once the silt 152 in reclamation area 154 reaches the top of the final filter block 170, filter blocks 170 are placed over upper rail members 168 between adjacent reclamation leg 166, and filter pad 184 is located on the landward side of reclamation leg 166. The process of dredging and building up the reclamation area 154 is repeated, until filter blocks 170 are stacked to the top of reclamation leg 166 and the spoil is filled to that level. After the spoil has settled and the moisture drained, a cap 194 of cement may be poured along the built up silt 152 and adjacent top of the legs 166 and filter blocks 170. At this point the built up silt 152 may be prepared for landscaping or other uses.

Permeable reclamation wall 151 combines the shoreline soil retentive features of a seawall or revetment with the energy absorbing features of the permeable breakwater 10. As shown in FIG. 16, the seaward permeable slots 92 face the ocean, and will engage waves 22 impinging the shoreline 16. Waves 22 will dissipate and reflect their energy in permeable reclamation wall 151. The fronds 68 or other dissipation media within settlement cavity 58 will absorb wave energy as water rushes into the cavity through seaward permeable slots 92 and from the water reflected off of the landward chords 30 and filter blocks 170.

Figure 15:
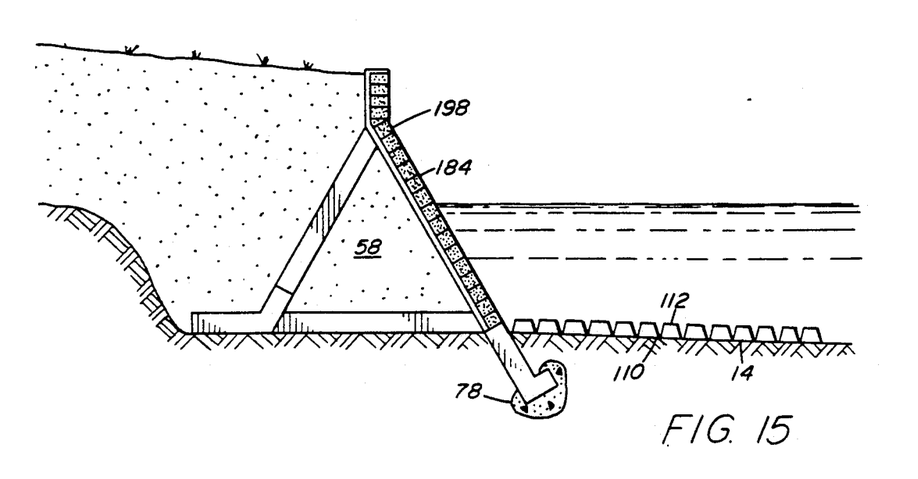
FIG. 15 is a side view of another alternative embodiment of the reclamation seawall of FIG. 13.

Referring now to FIGS. 15 and 16, there is shown an alternative system of constructing the reclamation wave wall section 156 to form a reclaimed seawall 196, wherein lower rail members 164 are disposed upon the opposed sides of seaward member 32 rather than landward chord 30, and extend therealong into toe section 50. Filter blocks 170 are located on lower rail members 164 to the upper terminus thereof, and filter blocks 170 are located on upper rail members 168 between adjacent reclamation leg 166. The continuous surface formed by adjacent seaward face 32 and filter blocks 170 forms a seawall. A filter pad 184 is disposed on the inner side of seaward members 32 to help retain spoilage behind the filter blocks 170 within reflection and settlement cavity 58 during the dredging and drainage process.

To form a seawall 196, a series of reclamation wall section 156 are anchored on the seabed 14 over filter fabric 110 at the interface of the reclamation area 154 and open water to form a reclaimed seawall. Rip rap 112, or other heavy materials, are placed over filter fabric 110 to maintain the reclamation wall section 156 in place.

To begin reclamation, a length of filter pad 184 is located against the seaward members 32 within reflection and settlement cavity 58. Two or three filter blocks 170 are then stacked between each seaward face member 32 by sliding them over lower rail members 164. Spoil is then pumped into reclamation area 154 in stages until the silt 152 reaches the level of the top filter block 170. The silt which settles from the spoilage will settle in cavity 58 and up against filter fabric. This soil tends to anchor reclaimed seawall 196 in place.

Once the silt level in the reclamation area 154 reaches the top filter block 170, another filter block is placed between each seaward member 32, and spoilage is pumped into reclamation area 154. This step is repeated until the space between seaward members 32 is filled with filter blocks 170 to the upper terminus of lower rail members 164. At this point, the filter blocks are placed over upper rail members 168 between each reclamation leg 166, and the process is repeated until the soil level in reclamation area 154 reaches the top of reclamation leg 166. At this point a cap 194 may be placed over the top of the reclamation leg 166, final filter blocks 170 and adjacent soil area. The reclamation leg 166 may include fence posts 190 for building a fence thereon.

The filling of the wall slots 96 of the seaward members 34 creates a hard seawall as opposed to the wave dissipation effect created by placing the filter blocks 170 in the landward chords 38. Although permeable reclamation wall 151 and reclamation seawall 196 have been described having a toe section 50, and reclamation leg 166, the invention may be practiced without either feature, or, with or without additional heal anchoring devices. Further, although a triangular cross section is shown, other cross sections may be used without deviating from the scope of the invention.

Although the preferred embodiment employs rectangular cross sectioned cement members, the structural members may be replaced with plastic tubing or hollow or cement filled plastic or metal channels without deviating from the scope of the invention.

While a preferred embodiment of the invention has been shown and described, modifications thereof can be made by one skilled in the art without departing from the spirit of the invention.

We claim:

1. A permeable breakwater adapted for underwater installation offshore comprising:
   a base;
   a seaward permeable wall projecting upward from the seaward side of said base;
   a landward permeable wall having one end connected to said base and projecting upward from the landward side of said base and having another end attached to said seaward permeable wall, said landward and seaward permeable walls having apertures for the flow of water therethrough; and
   a permeable wave wall projecting upwardly at an angle to said seaward permeable wall to reflect waves and dissipate wave energy;
   said seaward permeable wall includes spaced anchor sections projecting from said seaward permeable wall, and said anchor sections include a foot projecting at an angular deviation to said seaward permeable wall.

2. The breakwater of claim 1 wherein said base, seaward permeable wall and landward permeable wall form a dissipation and settlement cavity with said base whereby the velocity of the water is reduced as the water flows through said apertures causing the suspended accumulants to settle out of the water.

3. The permeable breakwater of claim 2 wherein said dissipation and settlement cavity has a triangular cross section and includes means for dissipating the energy of the water travelling through said apertures.

4. The permeable breakwater of claim 1 wherein said anchor sections include a tubular channel projecting therethrough and exiting at said foot for the passage of concrete therethrough.

5. The permeable breakwater of claim 1 wherein said permeable wave wall projects upwardly at the intersection of said seaward and landward permeable walls and includes apertures therethrough.

6. The permeable breakwater of claim 1 wherein a foil projects from the free end of said wave wall.

7. The permeable breakwater of claim 1 wherein a perch wall is disposed at an angle to and adjacent said landward permeable wall adjacent said base.

8. The permeable breakwater of claim 1 wherein said base and said landward permeable wall include a series of staggered, unitary angular beams forming said apertures between adjacent beams in said landward permeable wall.

9. The permeable breakwater of claim 8 wherein said seaward permeable wall includes a series of staggered beams forming said apertures between adjacent beams in said seaward permeable wall.

10. The permeable breakwater of claim 9 wherein said beams forming said seaward permeable wall are alternatively located between said beams forming said base and landward permeable wall on the seaward side and perch wall members are disposed between said beams on the landward side.

11. The permeable breakwater of claim 10 wherein said alternating beams are interconnected with a stud passing therethrough.

12. The permeable breakwater of claim 10 wherein said perch wall includes an upwardly projecting portion which is interposed between said unitary angular beams to form a wall to block free seaward travel of the undertow current.

13. The permeable breakwater of claim 12 wherein said beams are precast concrete channels having a rectangular cross-section.

14. The permeable breakwater of claim 12 wherein said beams are constructed from plastic pipe.

15. A breakwater adapted for underwater installation offshore comprising;
a plurality of adjacent triangular segments each having a base, a first member having one end attached to one end of said base, and a second member having one end attached to the other end of said base, said first and second members having their other ends attached together;
said first member and said base being attached on one side of said second member to form first slots between adjacent second members;
spacers disposed between adjacent first members of said segments to form second slots between adjacent first members;
means for attaching said plurality of segments adjacent each other;
a plurality of spaced legs extending at an angle from said other ends of said members; and
a plurality of anchors extending at an angle from said segments.

16. The breakwater of claim 15 wherein said anchor includes a foot extending at an angle from one of said members.

17. The breakwater of claim 15 wherein said anchor includes an attached screen for holding concrete.

18. The breakwater of claim 15 further including fronds suspended from said segments.

19. The breakwater of claim 15 wherein said spacers have a portion extending upwardly to form a barrier to the undertow current.

20. The breakwater of claim 15 further including a filter fabric underneath said base.

21. The permeable breakwater of claim 1 further including a perch wall having an upwardly projecting portion blocking the free seaward travel of the undertow current.

22. The permeable breakwater of claim 1 wherein the cross-sectional area of said apertures in said landward permeable wall is less than that of said apertures in said seaward permeable wall.

23. The breakwater of claim 20 wherein said filter fabric extends seaward of said seaward permeable wall and rip rap is placed on said filter fabric to prevent water scouring.

* * * * *